US011738479B1

(12) United States Patent
Aitharaju et al.

(10) Patent No.: US 11,738,479 B1
(45) Date of Patent: Aug. 29, 2023

(54) MOLD FOR FORMING COMPOSITE PREFORMS WITH HIGH PRECISION

(71) Applicant: GM GLOBAL TECHNOLOGY OPERATIONS LLC, Detroit, MI (US)

(72) Inventors: Venkateshwar R. Aitharaju, Troy, MI (US); Selina X. Zhao, Rochester Hills, MI (US); Ritesh Dixit, Troy, MI (US); Terrence Wathen, Sterling Heights, MI (US); Alexander Millerman, Bloomfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/731,843

(22) Filed: Apr. 28, 2022

(51) Int. Cl.
  *B29C 33/30* (2006.01)
  *B29C 33/20* (2006.01)
  *B29B 11/14* (2006.01)
  *B29B 11/06* (2006.01)

(52) U.S. Cl.
  CPC ............ *B29C 33/303* (2013.01); *B29B 11/06* (2013.01); *B29B 11/14* (2013.01); *B29C 33/202* (2013.01)

(58) Field of Classification Search
  CPC ....... B29C 70/56; B29C 70/541; B29C 33/02; B29C 33/12; B29C 33/303; B29C 33/202; B29C 70/46; B29B 11/06; B29B 11/14
  See application file for complete search history.

(56) References Cited

U.S. PATENT DOCUMENTS

| | | | |
|---|---|---|---|
| 7,393,202 B1* | 7/2008 | Slutsky | B29C 51/262 425/384 |
| 11,273,611 B2 | 3/2022 | Aitharaju et al. | |
| 2020/0376737 A1* | 12/2020 | Kim | G05B 19/4155 |
| 2021/0101318 A1 | 4/2021 | Rodgers et al. | |
| 2022/0063213 A1* | 3/2022 | Ohki | B29C 43/34 |
| 2022/0227078 A1* | 7/2022 | Wadsworth | B29C 70/541 |

FOREIGN PATENT DOCUMENTS

EP        0480652 A1 *   4/1992

* cited by examiner

*Primary Examiner* — Hana C Page
(74) *Attorney, Agent, or Firm* — Quinn IP Law

(57) ABSTRACT

A mold for molding a composite preform that has an outer edge thereabout and a plurality of tethers each attached at respective opposed ends thereof to the outer edge. The mold includes first and second mold halves defining a mold body and being configured to transition between an open position and a generally closed position, and a plurality of moveable members each having a moveable gage pin configured for being wrapped thereabout by a respective one of the tethers and a respective actuator configured for moving the moveable gage pin between a respective first position in which the respective moveable gage pin is disposed at a respective first distance from a center of the mold body and a respective second position in which the respective moveable gage pin is disposed at a respective second distance from the center of the mold body that is less than the first distance.

20 Claims, 10 Drawing Sheets

MOLD FOR FORMING COMPOSITE PREFORMS WITH HIGH PRECISION

INTRODUCTION

This disclosure relates generally to molds for forming composite preforms with high precision.

One method for fabricating a structural or cosmetic part is to place one or more layers of composite preforms into a two-part mold consisting of male and female mold halves, and then pressing the mold halves together to form the part. After the one or more layers are pressed and formed by the mold, the process may be repeated with additional layers being added to the already-formed layers until the desired thickness is achieved and the finished part is produced.

Variability in the placement or alignment of composite preforms within molds sometimes results in uncertainty as to the resulting properties of the molded parts. Additionally, wrinkles, kinks, bunch-ups and other undesired features may inadvertently be introduced into the part because of inconsistencies or errors in the placement or alignment of the preforms.

SUMMARY

According to one embodiment, a mold is presented for molding a composite preform, wherein the preform includes a sheet of composite material having an outer edge thereabout and a plurality of tethers each attached at respective opposed ends thereof to the outer edge. The mold includes a first mold half having a first molding surface, and a second mold half having a second mold surface. The first and second mold halves define a mold body and are disposed with the first and second molding surfaces facing each other. The mold halves are configured to transition between an open position in which the mold halves are spaced apart from each other, and a generally closed position in which the mold halves are proximate each other. The mold also includes a plurality of moveable members, each having a respective moveable gage pin configured for being wrapped thereabout by a respective one of the plurality of tethers and a respective actuator configured for moving the respective moveable gage pin between a respective first position, in which the respective moveable gage pin is disposed at a respective first distance from a center of the mold body, and a respective second position, in which the respective moveable gage pin is disposed at a respective second distance from the center of the mold body that is less than the first distance.

The moveable members may be configured such that when the composite preform is placed between the first and second mold halves in the open position and each moveable gage pin is wrapped thereabout by a respective tether, and the actuators move their respective moveable gage pins from their respective first positions to their respective second positions as the mold halves are moved into the generally closed position, the moveable members are effective to cause or facilitate a shrinkage of a planar-projected area of the composite preform. Each of the moveable members may be configured such that a respective tether may be wrapped about the respective moveable gage pin in either a hanger configuration in which the respective tether does not cross itself or a loop configuration in which the respective tether does cross itself.

The mold may further include one or more stationary gage pins each configured for being wrapped thereabout by a respective one of the plurality of tethers and for remaining in a fixed position when the plurality of moveable members are moved from their respective first positions to their respective second positions. Further, one of the first and second molding surfaces may protrude generally outward from its respective mold half, and the other of the first and second molding surfaces may recede generally into its respective mold half.

Each moveable gage pin may be configured to follow a respective linear path between its respective first and second positions, wherein each linear path may include one or more straight linear paths, one or more curved linear paths, or a combination of one or more straight linear paths and one or more curved linear paths. Two or more of the linear paths may have respective extensions which intersect to define a central point or area, and at least one other of the linear paths may have a respective extension which does not point toward the central point or area.

At least one of the actuators may include a first arrangement, which includes one or more of a linear actuator for directly or indirectly moving the moveable gage pin along a first direction, an extension plate for directly or indirectly moving the moveable gage pin along a second direction, an extendable member for directly or indirectly moving the moveable gage pin along a third direction, and one or more mechanical interconnections between or among two or more of the linear actuator, the extension plate and the extendable member.

Further, at least one of the actuators may include a second arrangement, which includes a fixed plate having a first aperture formed therein along a first path, and a moveable plate having a second aperture formed therein along a second path. In this second arrangement, the moveable plate may be configured for movement along a primary direction during which the first and second apertures overlap each other to form a pocket for receiving a respective one of the moveable gage pins therein, such that during the movement, the respective moveable gage pin is urged along the respective linear path of the moveable gage pin.

Moreover, at least one of the actuators may include a third arrangement, which includes a rotatable plate configured for rotation about a rotational axis and having an arcuate aperture formed therein along a circumferential path and a through-hole formed therein, and a translatable plate having a respective one of the moveable gage pins attached thereto and being configured for translation along a longitudinal axis thereof and having a straight aperture formed therein along a longitudinal path. In this third arrangement, the arcuate and straight apertures may overlap each other to form a pocket for receiving a first fastener therein and wherein a second fastener is disposed through the straight aperture and the through-hole, such that during the rotation and/or translation, the respective moveable gage pin is urged along the respective linear path of the moveable gage pin.

According to a second embodiment, a mold for molding a composite preform is presented, wherein the preform includes a sheet of composite material having an outer edge thereabout and a plurality of tethers each attached at respective opposed ends thereof to two respective points along the outer edge. In this embodiment, the mold includes: (i) a first mold half having a first molding surface; (ii) a second mold half having a second mold surface; (iii) the first and second mold halves defining a mold body and being disposed with the first and second molding surfaces facing each other, the mold halves being configured to transition between an open position in which the mold halves are spaced apart from each other and a generally closed position in which the mold halves are proximate each other; and (iv) a plurality of moveable members each having a respective moveable gage pin configured for being wrapped thereabout by a respective one of the plurality of tethers when the composite preform is disposed between the first and second mold halves and a respective actuator configured for moving the respective moveable gage pin between a respective first position in which the respective moveable gage pin is disposed at a respective first distance from a center of the mold body and a respective second position in which the respective moveable gage pin is disposed at a respective second distance from the center of the mold body that is less than the first distance. In this second embodiment, the moveable members are configured such that when the composite preform is placed between the first and second mold halves in the open position and each moveable gage pin is wrapped thereabout by a respective tether, and the actuators move their respective moveable gage pins from their respective first positions to their respective second positions as the mold halves are moved into the generally closed position, the moveable members are effective to cause or facilitate a shrinkage of a planar-projected area of the composite preform. Further, in this embodiment, each of the plurality of moveable members is configured such that a respective tether may be wrapped about the respective moveable gage pin in either a hanger configuration in which the respective tether does not cross itself or a loop configuration in which the respective tether does cross itself.

The mold may further include one or more stationary gage pins, where each is configured for being wrapped thereabout by a respective one of the plurality of tethers and for remaining in a fixed position when the plurality of moveable members are moved from their respective first positions to their respective second positions. The mold may further be configured such that one of the first and second molding surfaces protrudes generally outward from its respective mold half, while the other of the first and second molding surfaces recedes generally into its respective mold half.

In this embodiment, each moveable gage pin may be configured to follow a respective linear path between its respective first and second positions, and each linear path may include one or more straight linear paths, one or more curved linear paths, or a combination of one or more straight linear paths and one or more curved linear paths. In this configuration, two or more of the linear paths may have respective extensions which intersect to define a central point or area, and at least one other of the linear paths may have a respective extension which does not point toward the central point or area.

In this second embodiment, at least one of the actuators may include a first arrangement which includes one or more of: a linear actuator for directly or indirectly moving the moveable gage pin along a first direction; an extension plate for directly or indirectly moving the moveable gage pin along a second direction different from the first direction; an extendable member for directly or indirectly moving the moveable gage pin along a third direction different from each of the first and second directions; and one or more mechanical interconnections between or among two or more of the linear actuator, the extension plate and the extendable member.

As an additional or alternative aspect, at least one of the actuators may include a second arrangement which includes: a fixed plate having a first aperture formed therein along a first path; and a moveable plate having a second aperture formed therein along a second path, the moveable plate being configured for movement along a primary direction during which the first and second apertures overlap each other to form a pocket for receiving a respective one of the moveable gage pins therein, such that during the movement the respective moveable gage pin is urged along the respective linear path of the moveable gage pin.

And as a further additional or alternative aspect, at least one of the actuators may include a third arrangement which includes: a rotatable plate configured for rotation about a rotational axis and having an arcuate aperture formed therein along a circumferential path and a through-hole formed therein; and a translatable plate having a respective one of the moveable gage pins attached thereto and being configured for translation along a longitudinal axis thereof and having a straight aperture formed therein along a longitudinal path, wherein the arcuate and straight apertures overlap each other to form a pocket for receiving a first fastener therein and wherein a second fastener is disposed through the straight aperture and the through-hole, such that during the rotation and/or translation the respective moveable gage pin is urged along the respective linear path of the moveable gage pin.

According to a third embodiment, a mold is presented for molding a composite preform, in which the preform includes a sheet of composite material having an outer edge thereabout and a plurality of tethers each attached at respective opposed ends thereof to two respective points along the outer edge. In this embodiment, the mold includes: first and second mold halves having respective first and second molding surfaces and defining a mold body, the mold halves being configured for disposition with the first and second molding surfaces facing each other, the mold halves being configured to transition between an open position in which the mold halves are spaced apart from each other and a generally closed position in which the mold halves are proximate each other; and a plurality of moveable members each having a respective moveable gage pin configured for being wrapped thereabout by a respective one of the plurality of tethers when the composite preform is disposed between the first and second mold halves and a respective actuator configured for moving the respective moveable gage pin between a respective first position in which the respective moveable gage pin is disposed at a respective first distance from a center of the mold body and a respective second position in which the respective moveable gage pin is disposed at a respective second distance from the center of the mold body that is less than the first distance.

In this third embodiment, at least one of the actuators includes: (i) a first arrangement comprising one or more of a linear actuator for directly or indirectly moving the moveable gage pin along a first direction, an extension plate for directly or indirectly moving the moveable gage pin along a second direction, an extendable member for directly or indirectly moving the moveable gage pin along a third direction; and one or more mechanical interconnections between or among two or more of the linear actuator, the extension plate and the extendable member; or (ii) a second arrangement comprising a fixed plate having a first aperture formed therein along a first path, and a moveable plate having a second aperture formed therein along a second path, the moveable plate being configured for movement along a primary direction during which the first and second apertures overlap each other to form a pocket for receiving a respective one of the moveable gage pins therein, such that during the movement the respective moveable gage pin is urged along the respective linear path of the moveable gage pin; or (iii) a third arrangement comprising a rotatable plate configured for rotation about a rotational axis and having an arcuate aperture formed therein along a circumferential path and a through-hole formed therein, and a translatable plate having a respective one of the moveable gage pins attached thereto and being configured for translation along a longitudinal axis thereof and having a straight aperture formed therein along a longitudinal path, wherein the arcuate and straight apertures overlap each other to form a pocket for receiving a first fastener therein and wherein a second fastener is disposed through the straight aperture and the through-hole, such that during the rotation and/or translation of the respective moveable gage pin is urged along the respective linear path of the moveable gage pin.

In this third embodiment, the moveable members may be configured such that when the composite preform is placed between the first and second mold halves in the open position and each moveable gage pin is wrapped thereabout by a respective tether, and the actuators move their respective moveable gage pins from their respective first positions to their respective second positions as the mold halves are moved into the generally closed position, the moveable members are effective to cause or facilitate a shrinkage of a planar-projected area of the composite preform. Further, each of the plurality of moveable members may be configured such that a respective tether may be wrapped about the respective moveable gage pin in either a hanger configuration in which the respective tether does not cross itself or a loop configuration in which the respective tether does cross itself.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
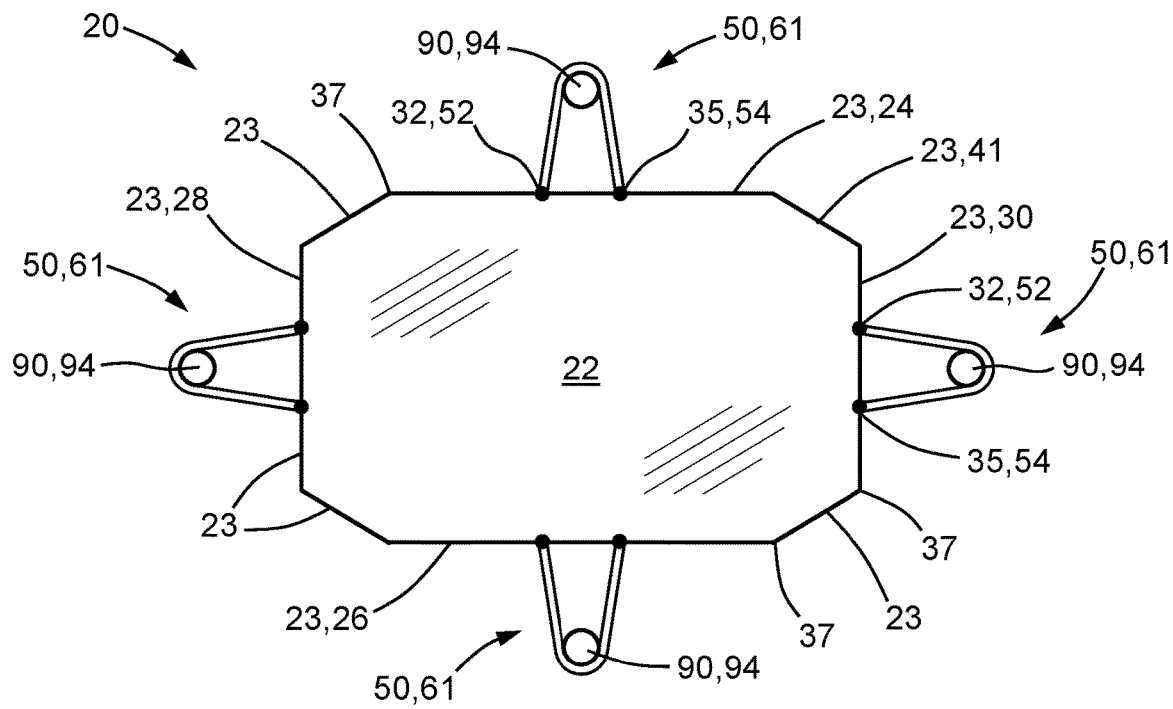
FIG. 1 is a schematic top view of a composite preform with tethers in a hanger configuration and in a first position.

Referring now to the drawings, wherein like numerals indicate like parts in the several views, a composite preform 20 and a mold 70 for molding the composite preform 20 are shown and described herein.

FIGS. 1-4 show schematic top views of various embodiments of a composite preform 20 according to the present disclosure. Each preform 20 includes a sheet 22 of composite material having opposed first and second edges 24, 26 which are part of the overall outer edge or perimeter 23 of the sheet 22. As shown in the drawings, the outer edge or perimeter 23 may also include opposed third and fourth edges 28, 30, as well as other edges. Although the sheet 22 is illustrated in the drawings as being generally octagonal in shape, the sheet 22 may assume any suitable shape (e.g., rectangular, irregular, etc.) and is not limited to being generally octagonal. The composite material may be fiberglass, polyester, polyamide, carbon fiber, cloth/fabric and/or other similar materials, which may be rendered in the form of strands, filaments, weaves, strips, sheets, chopped segments, etc., in one or more plies or layers, and with or without a resin/binder. Each of the opposed first and second edges 24, 26 has a respective one or more first connection points 32 and a respective one or more second connection points 35 located therealong.

Figure 2:
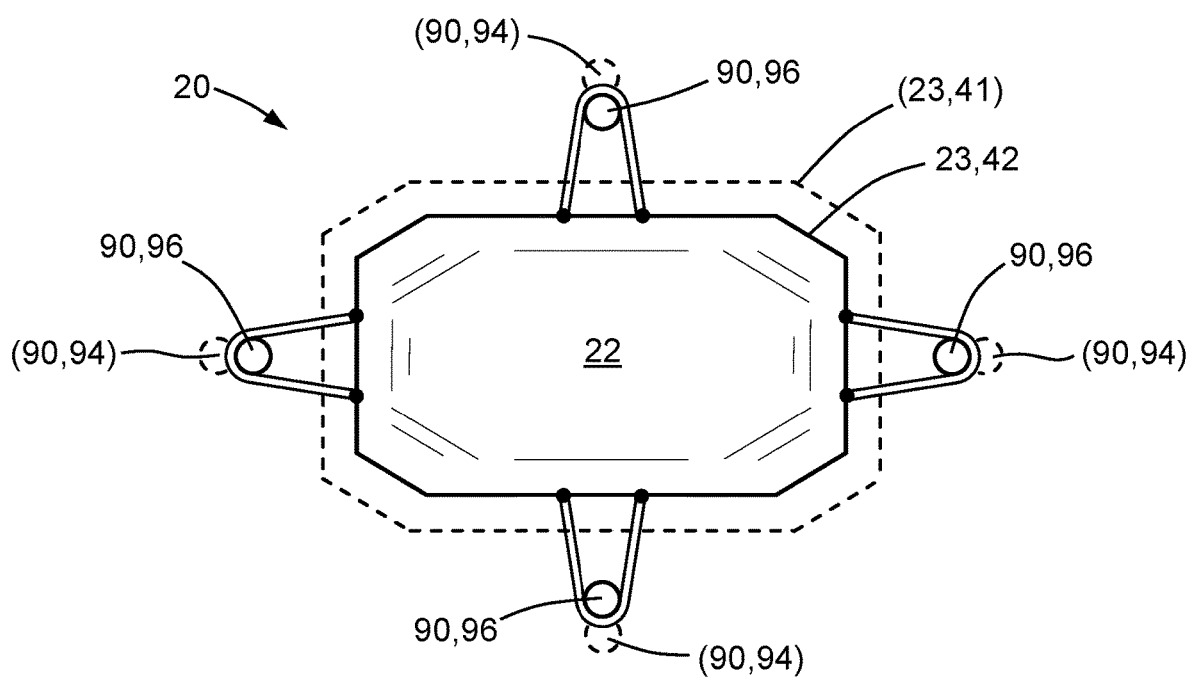
FIG. 2 is a schematic top view of the composite preform of FIG. 1 with the tethers in a second position.
Figure 3:
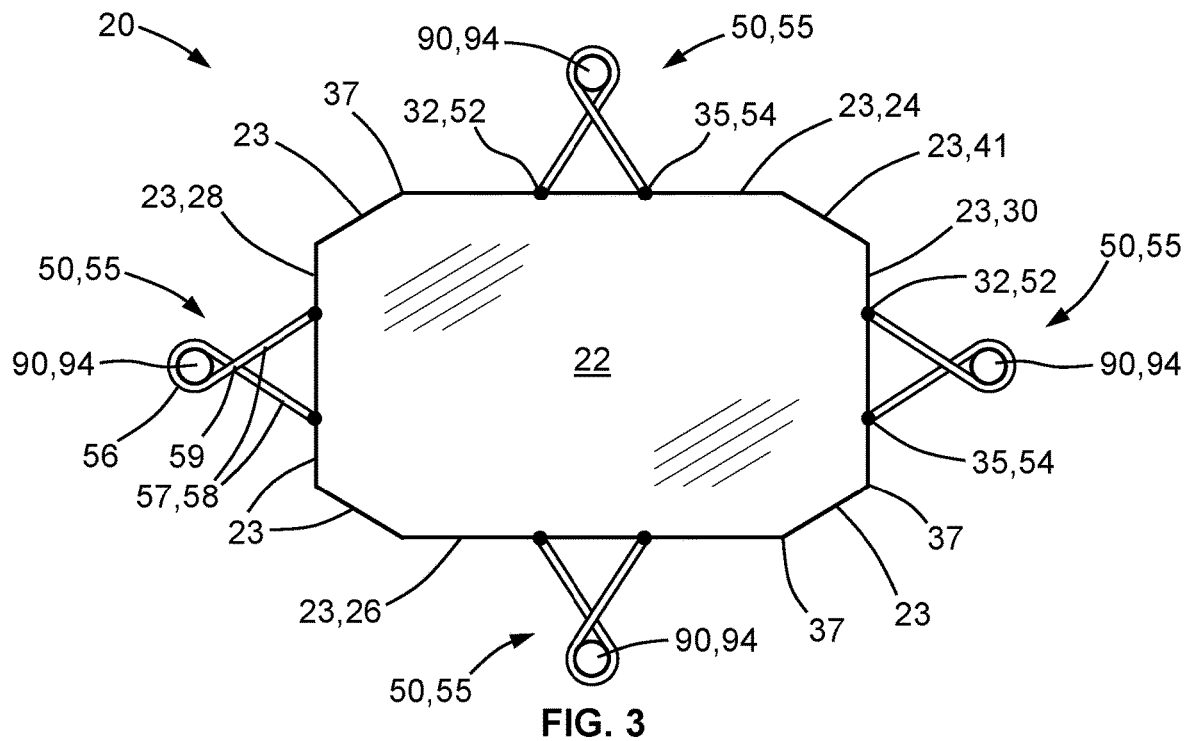
FIG. 3 is a schematic top view of a composite preform with tethers in a loop configuration.
Figure 4:
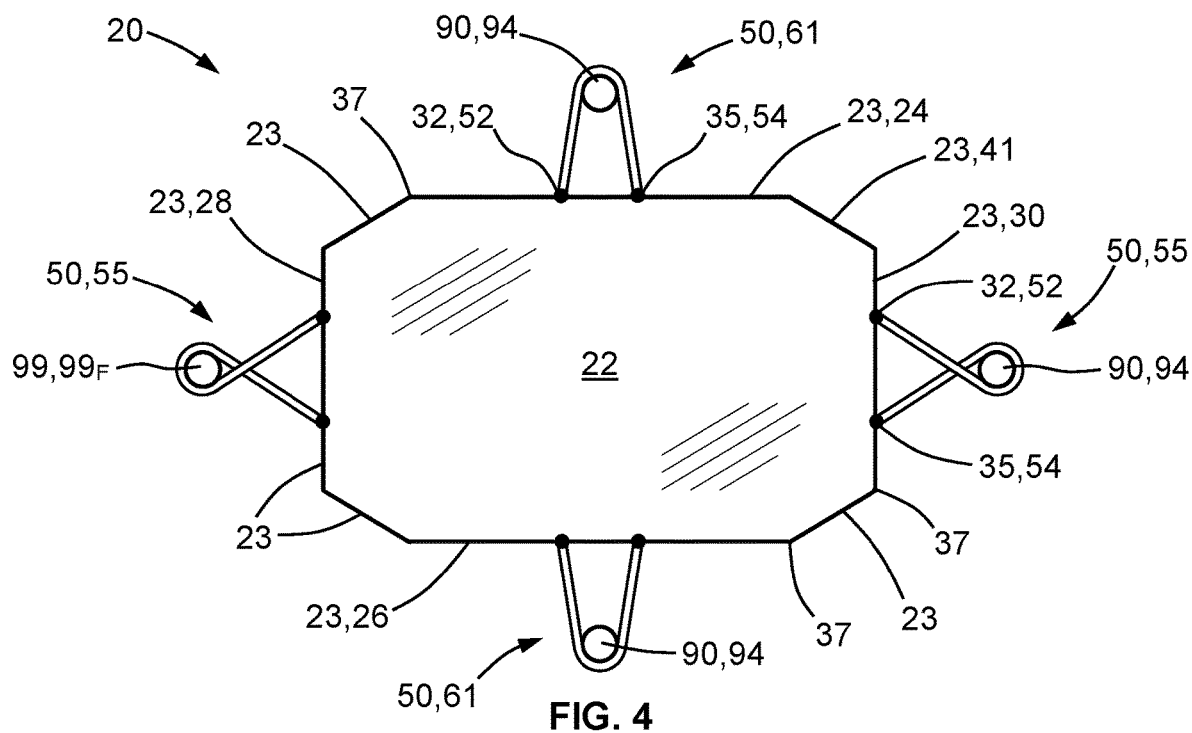
FIG. 4 is a schematic top view of a composite preform with tethers in both hanger and loop configurations.

Each preform 20 also includes two or more tethers 50. Each tether 50 is attached at a respective first end 52 thereof to a respective one of the first connection points 32 and has a respective second end 54 thereof attached to a respective second connection point 35. FIGS. 1-2 show each of the tethers 50 formed in a "hanger" configuration 61, FIG. 3 shows the tethers 50 formed in a "loop" configuration 55, and FIG. 4 shows a combination of hanger and loop configurations 61, 55. As illustrated in the drawings, the hanger configuration 61 is configured for simply arcing around a gage pin 90, 99 (such as in a general "U" or "V" shape), while the loop configuration 55 arcs around a gage pin 90, 99 but also has the two legs 58 of the tether 50 which cross each other. More specifically, each tether 50 in a loop configuration 55 includes a looped portion 56 which arcs around the full ambit or circumference of a gage pin 90, 99, and a non-looped portion 57 comprising two legs 58 which cross each other at a crossing point 59.

Each connection point 32, 35 may be located at a corner 37 formed where two edges of the perimeter 23 meet, or each connection point 32, 35 may be located along an edge (e.g., 24, 26, 38, 30, etc.). For example, both the first and second connection points 32, 35 may be located along the same edge as each other, or the first connection point 32 may be located along one edge while the second connection point 35 is located along a different edge from the first connection point 32. As another example, the two connection points 32, 35 may be located at two respective corners 37, or one connection point 32, 35 may be located at a corner 37 while the other connection point 32, 35 is located along an edge.

The tethers 50 may be made of composite material, which may be the same as or different from the composite material from which the sheet 22 is made. The tethers 50 and the sheet 22 of composite material may be formed together during a singular fabrication process, such as being cut from a single blank of composite material, or created as a unitary structure by an additive manufacturing process such as 3D printing. Alternatively, the tethers 50 may be formed separately from the sheet 22 of composite material, and may be attached to the sheet 22 after fabrication of the sheet 22, such as by using an adhesive, resin, mechanical coupling or the like. As a further alternative, the tethers 50 may be made of a material other than a composite material (e.g., cloth, rope, etc.), which may then be attached to the sheet 22.

Each tether 50 may be configured for use in a loop configuration 55 or in a hanger configuration 61. Optionally, each tether 50 may be formed in a particular way so as to maintain a desired hanger or loop configuration shape, such as by forming each tether 50 in the desired shape or configuration 55, 61, applying a stiffening or setting agent to the tether 50, and then holding the tether 50 in the desired shape (while optionally applying heat and/or pressure) until the desired shape or configuration 55, 61 is set. Or, the shape of the tethers 50 may not be pre-set. In either case, the length of each tether 50 may be selected so as to accommodate the desired shape or configuration 55, 61 such that each tether 50 may be wrapped around a respective gage pin 90, 99 when the sheet 22 is placed into a mold 70.

FIGS. 5-19 show various schematic views of a mold 70 for molding the composite preform 20 according to a first embodiment of the present disclosure, wherein the preform 20 includes a sheet 22 of composite material having an outer edge 23 thereabout and a plurality of tethers 50 each attached at respective opposed ends 52, 54 thereof to the outer edge 23. Note that x-y-z coordinate axes are provided in the lower-left corners of certain drawings. These coordinate axes follow the conventional "right-hand rule" approach for defining the respective positive and negative directions for each axis. For example, note that the negative y-direction is denoted in FIG. 7 as a circle with an "X" inside, indicating the tail of an arrow pointing out of the page at the viewer, with the head of the arrow pointing into the page away from the viewer in the positive y-direction. Similarly, in FIG. 9 the positive z-direction is denoted by a circle with a point inside, indicating the head of an arrow pointing out of the page at the viewer in the positive z-direction. These coordinate axes are provided for reference purposes only, but are useful for defining certain arbitrary directions that are referred to herein for the purpose of illustration. For example, the positive z-direction may be associated with directions, locations and orientations such as "upward", "top", "above" and the like, while the negative z-direction may be associated with "downward", "bottom", "below", etc.

The directions, locations and orientations relating to the positive and negative z-directions are denoted by reference numerals $87_T$ and $87_B$, respectively, where the subscript "T" denotes "top" and "B" denotes "bottom". Similarly, $87_F$ and $87_R$ denote the "front/forward" and "rear/rearward" directions, locations and orientations in the negative and positive y-directions, respectively. Likewise, $88_L$ and $88_R$ denote "first/left/leftward" and "second/right/rightward" sides, directions, locations and orientations in the negative and positive x-directions, respectively. Thus, reference numeral $87T$ may refer to the space above the top of the mold 70, and/or to the top outer surface of the mold 70 itself (i.e., the surface of the second/top mold half 76 that is opposite the second molding surface 78). Likewise, reference numerals $87_B$, $87_F$, $87_R$, $88_L$ and $88_R$ may each refer to the space below, in front of, to the rear of, to the left of and to the right of the mold 70, respectively, and/or to the bottom, front, rear, left and right outer surfaces of the mold 70, respectively.

Figure 7:
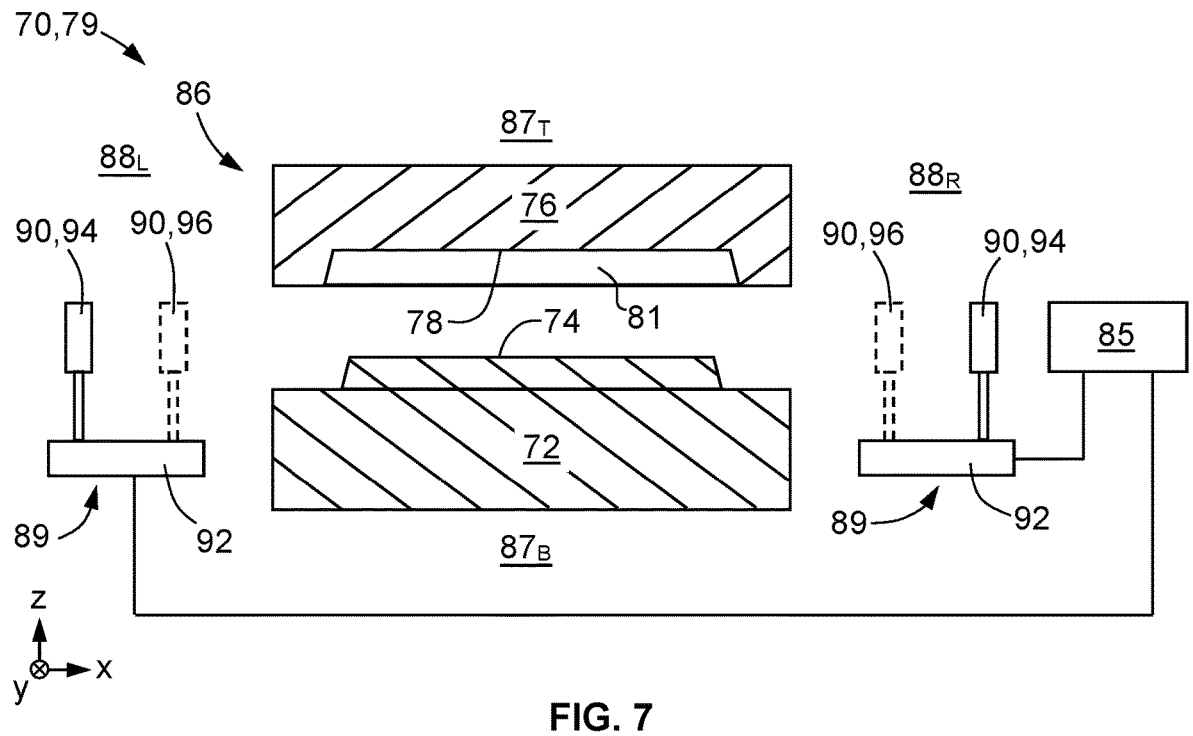
FIGS. 7-8 are schematic semi-sectional front views of a mold in open and generally closed positions, respectively.
Figure 8:
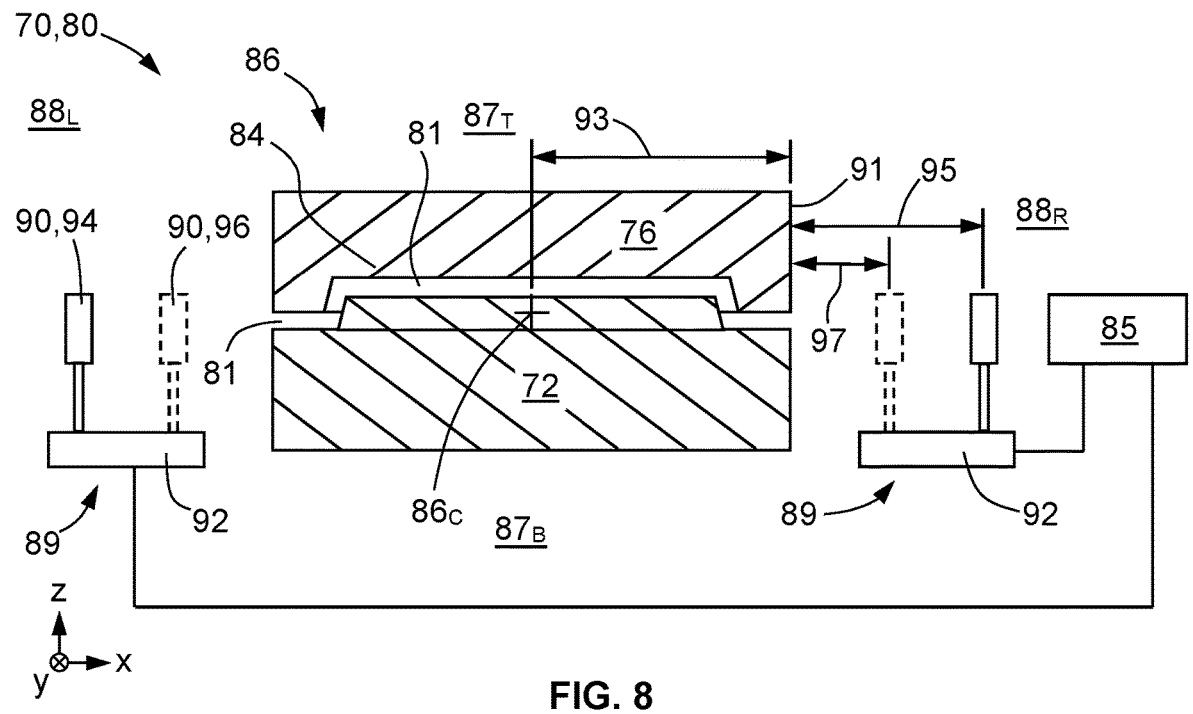

The mold 70 includes a first mold half 72 having a first molding surface 74, and a second mold half 76 having a second molding surface 78. The first and second mold halves 72, 76 define a mold body 86 and are disposed or oriented with the first and second molding surfaces 74, 78 facing each other. The mold halves 72, 76 are configured to transition between an open position 79 in which the mold halves 72, 76 are spaced apart from each other (FIG. 7), and a generally closed position 80 in which the mold halves 72, 76 are proximate each other and define a mold body 86 having a cavity 81 between the first and second molding surfaces 74, 78 (FIG. 8). This cavity 81 may be provided to capture the one or more layers of composite preforms 20 sandwiched between the opposed molding surface 74, 78 when the mold halves 72, 76 are pressed together in the generally closed position 80. (Note that the mold halves 72, 76 may be configured such that the distance separating the two molding surfaces 74, 78 may be increased as successive layers of composite sheets 22 or preforms 20 are added to the already-molded layers that are in the mold 70.)

Figure 9:
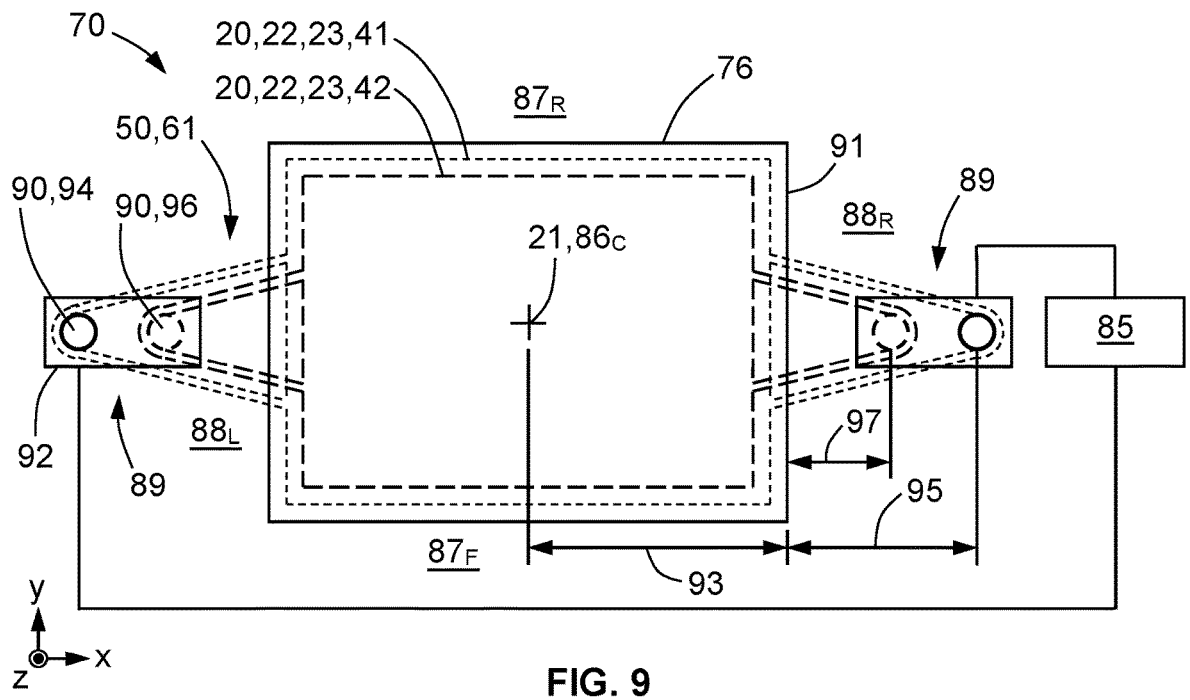
FIG. 9 is a schematic top view of one embodiment of a mold and a composite preform.
Figure 11:
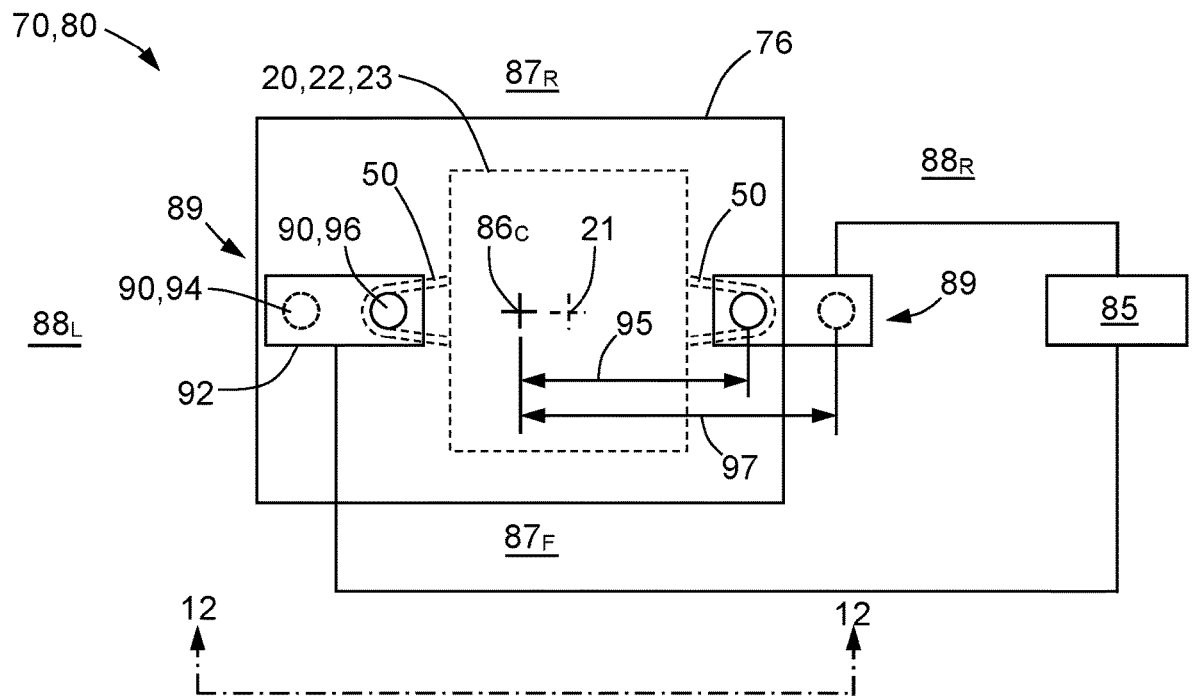
FIG. 11 is a schematic top view of yet another embodiment of a mold and composite preform.
Figure 12:
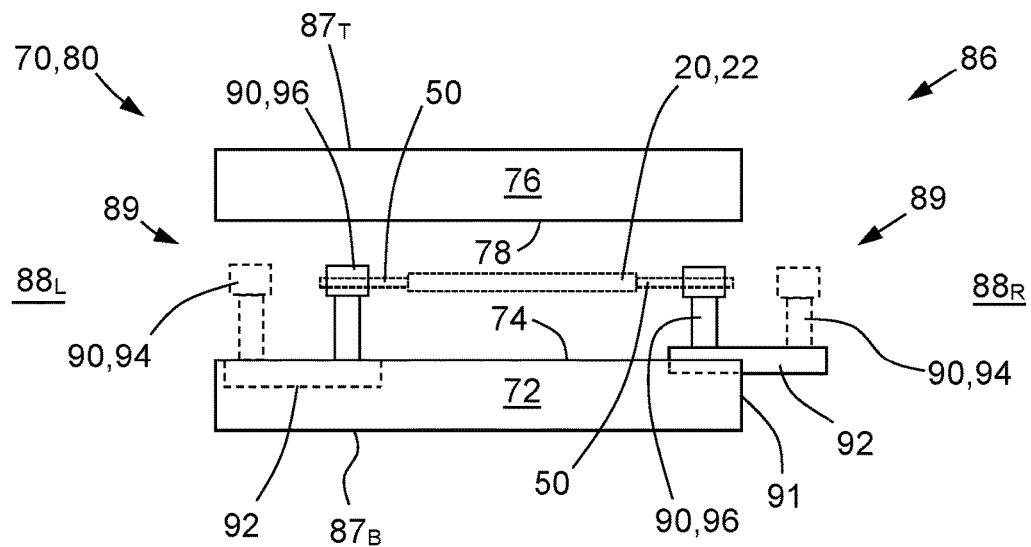
FIG. 12 is a schematic front view of the preform and mold of FIG. 11, as viewed along lines 12-12 of FIG. 11.

The mold 70 also includes a plurality of moveable members 89, each having a respective moveable gage pin 90 configured for being wrapped thereabout by a respective one of the plurality of tethers 50, and also having a respective actuator 92 configured for moving the respective moveable gage pin 90 between a respective first position 94, in which the respective moveable gage pin 90 is disposed at a respective first distance 95 from a center $86_C$ of the mold body 86, and a respective second position 96, in which the respective moveable gage pin 90 is disposed at a respective second distance 97 from the center $86_C$ of the mold body 86 that is less than the first distance 95. As illustrated in FIGS. 8, 9 and 11, the first and second distances 95, 97 may be measured directly from the center $86_C$ of the mold body 86 (as in FIG. 11), or they may be measured to an edge 91 of the mold body 86 which lies a given distance 93 from the center $86_C$ (as in FIGS. 8-9). Note that each of the moveable members 89 may be configured to move in any combination of x-, y- and z-directions between its respective first and second positions 94, 96, as well as to other positions. Also note that the center $86_C$ of the mold body 86 may coincide or align with a center 21 of the preform 20, as illustrated in FIG. 9, or the centers $86_C$, 21 might not coincide or align with each other, as shown in FIG. 11.

Figure 10:
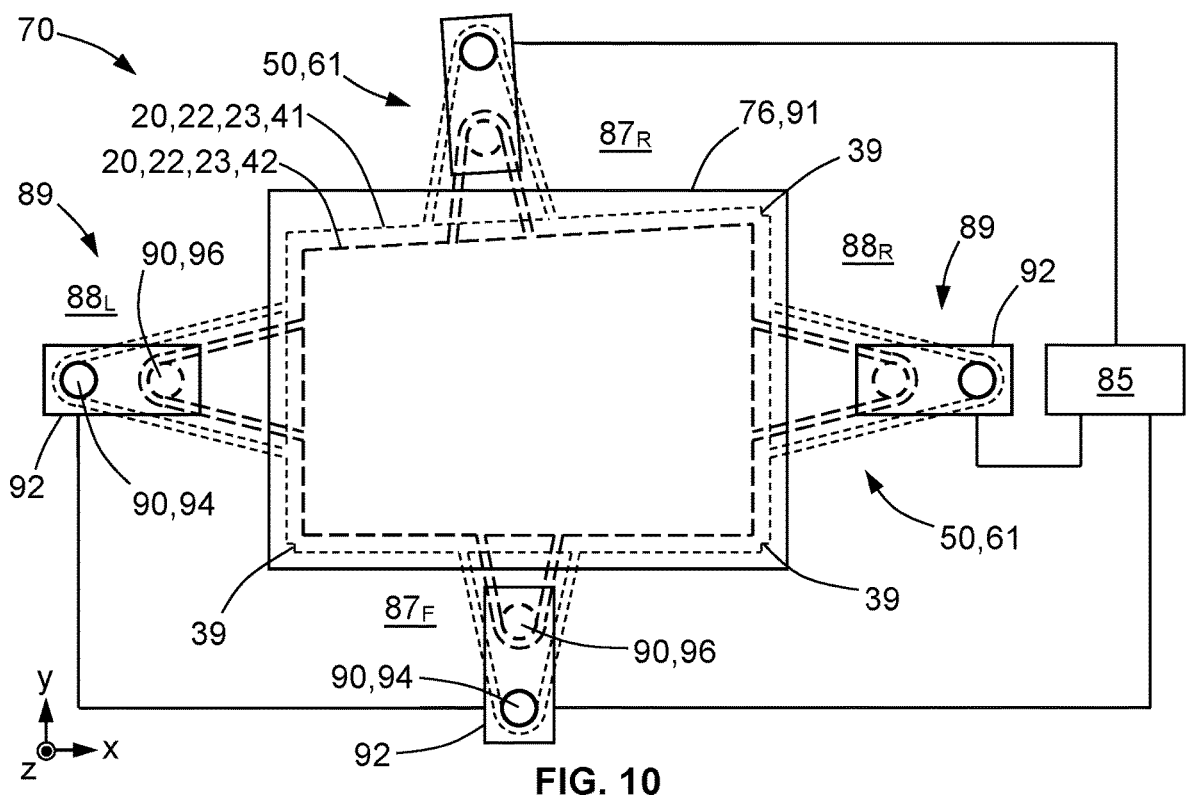
FIG. 10 is a schematic top view of another embodiment of a mold and composite preform.

The desired x-, y- and z-coordinates of each first and second position 94, 96 may be determined when the preform 20 is being designed. During this design stage, the layout of a composite part is determined, including the number of preforms 20 or layers needed to make the part, as well as the size, shape, dimensions and layout of various features (such as the tethers 50) for each preform 20. A final composite part may utilize multiple layers of preforms 20, and these preforms 20 may all be the same or they may differ in some respect. The design stage may include simulations and finite element analysis work to model the characteristics and details of both (i) the composite part and its layers of preforms 20, and (ii) the mold 70, including the layout of the molding surfaces 74, 78 and the respective first and second positions 94, 96 for each moveable member 89 or moveable gage pin 90. As part of the design stage, it is also determined how various portions of the preform 20 should be draped (e.g., against the first and/or second molding surfaces 74, 78) and in what directions, when it is placed into the mold 70, in order to avoid or minimize wrinkles and other potential defects, or to otherwise optimize the layout, strength or other characteristics of the finished part. During the design stage it may also be determined where the tethers 50 should be attached to the composite sheet 22, and whether a loop configuration 55 or a hanger configuration 61 should be used at each location. Optionally, one or more areas or portions of the finished part may be cut off or cut out during or after the molding process, which may include the tethers 50. For example, as shown in FIG. 10, the composite sheet 22 may include cutouts 39 at one or more corners, which may be designed so that the edges of the cutouts 39 are brought together during the draping and molding process to create deep-draw corners or other features.

In the foregoing arrangement, the first position 94 of each respective moveable gage pin 90 may be located in the first mold half 72, in the second mold half 76 or outside the mold body 86. Depending on the distance between the first and second positions 94, 96 for each moveable member 89, the second position 96 of each respective moveable gage pin 90 may itself be located in the first mold half 72, in the second mold half 76 or outside the mold body 86. For example, in FIGS. 7-10 each moveable member 89 is located entirely outside the mold body 86; two moveable members 89 are located on the first/left lateral side $88_L$ of the mold body 86, and two other moveable members 89 are located on the second/right lateral side $88_R$ of the mold body 86. However, in FIGS. 11-12, one moveable member 89 on the first/left lateral side $88_L$ of the mold body 86 is located within the first mold half 72, and another moveable member 89 on the second/right lateral side $88_R$ of the mold body 86 is located partially within the first mold half 72 and partially outside the mold body 86 with its first position 94 in the first mold half 72 and its second position 96 outside the mold body 86.

Figure 5:
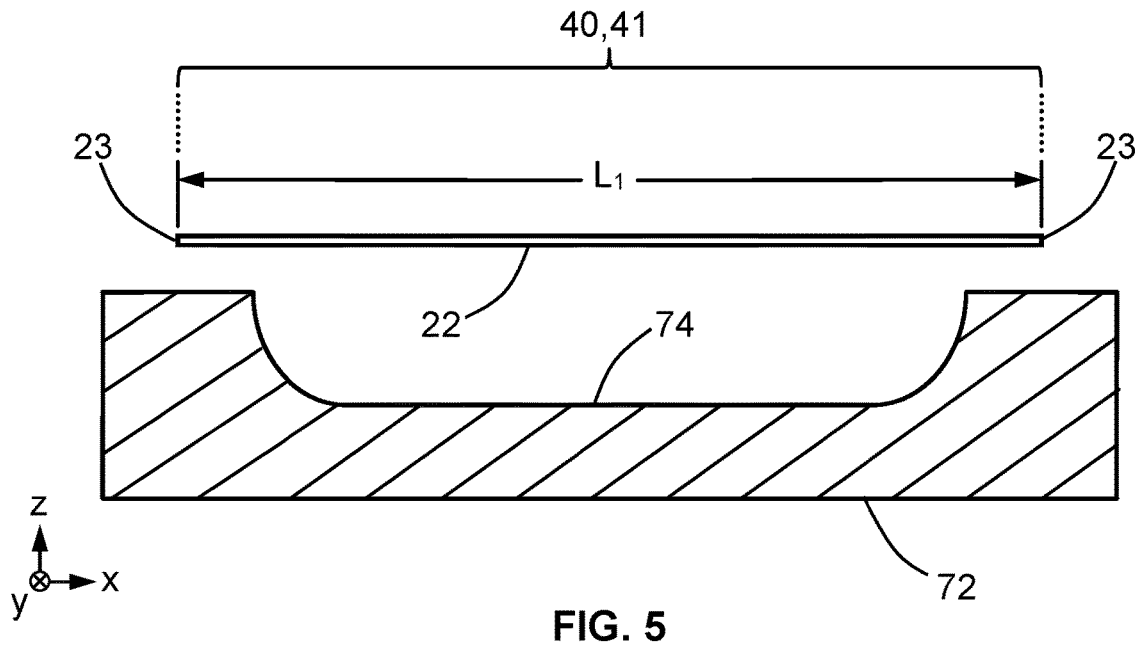
FIG. 5 is a schematic cross-sectional front view of a mold and composite preform before the preform is draped within the mold cavity.
Figure 6:
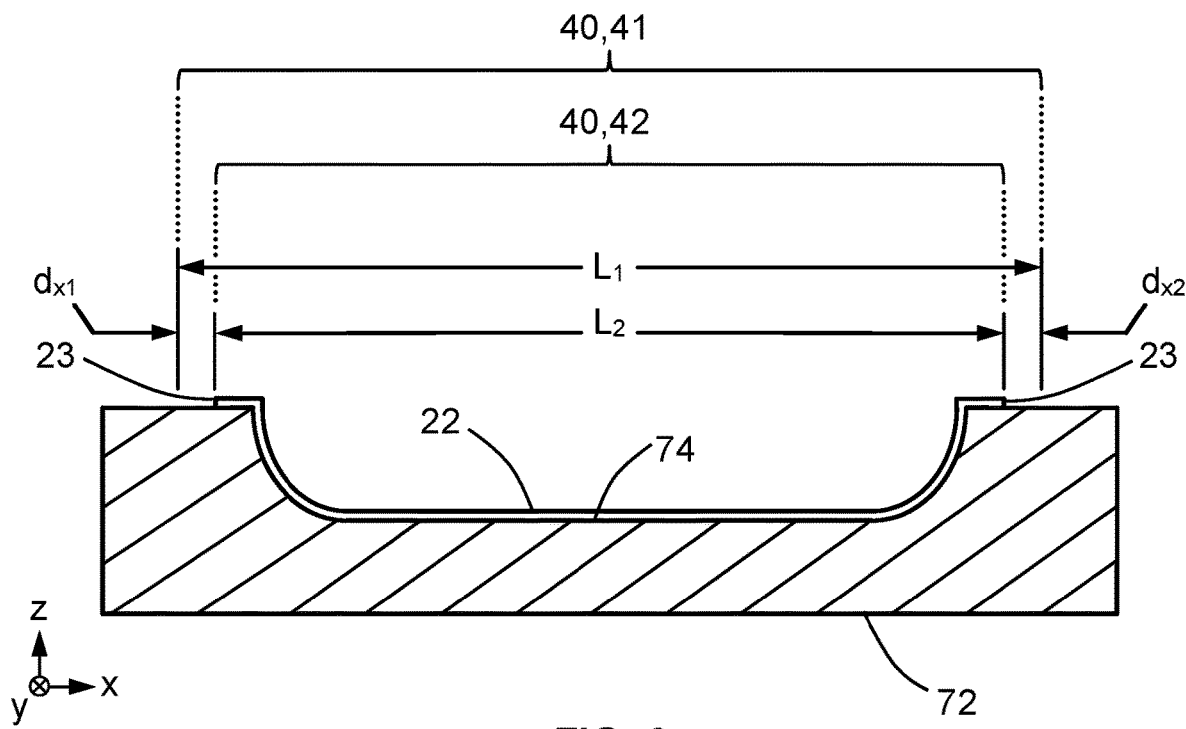
FIG. 6 is a schematic cross-sectional front view of the mold and composite preform of FIG. 5 after the preform is draped within the mold cavity.

The moveable members 89 may be configured such that when the composite preform 20 is placed between the first and second mold halves 72, 76 in the open position 79 and each tether 50 is wrapped about a respective moveable gage pin 90, and the actuators 92 move their respective moveable gage pins 90 from their respective first positions 94 to their respective second positions 96 as the mold halves 72, 76 are moved into the generally closed position 80, the moveable members 89 are effective to cause or facilitate a shrinkage of the overall planar-projected area 40 of the composite preform 20 from an initial planar-projected area 41 to a final planar-projected area 42. This shrinkage of the planar-projected area 40 of the preform 20 is illustrated in FIGS. 5-6, with FIG. 5 showing the initial planar-projected area 41 before the preform 20 is draped into the cavity 81 and FIG. 6 showing the final planar-projected area 42 after the preform 20 is draped into the cavity 81. Note that in FIG. 5, the preform 20 has an initial length $L_1$ as measured in the x-direction, while in FIG. 6 the preform 20 has a final length $L_2$ as measured in the x-direction. The difference between the initial and final lengths $L_1$, $L_2$ as measured in the x-direction—i.e., $L_2$-$L_1$—may be attributed to the preform 20 being draped onto the female mold surface 74 in the z-direction, and with this difference in length (i.e., $L_2$-$L_1$) being equally distributed on the left and right sides of the first mold half 72, it may be seen that a "shrinkage" of $d_{x1}$ and $d_{x2}$ are provided on the left and right sides, respectively.

As shown in FIG. 4, the mold 70 may further include one or more stationary gage pins 99 each configured for being wrapped thereabout by a respective one of the plurality of tethers 50 and for remaining in a fixed position $99_F$ when the plurality of moveable members 89 are moved from their respective first positions 94 to their respective second positions 96. Further, one of the first and second molding surfaces 74, 78 may protrude generally outward from its respective mold half 72, 76, and the other of the first and second molding surfaces 74, 78 may recede generally into its respective mold half 72, 76. For example, as illustrated in FIGS. 7-8, the first (lower) mold half 72 may be a "male" mold half whose first molding surface 74 generally protrudes outward (upward) from the first/lower/male mold half 72, and the second (upper) mold half 76 may be a "female" mold half whose second molding surface 78 generally recedes into the second/upper/female mold half 76. However, other configurations and arrangements of the mold halves 72, 76 are also possible. The composite preform 20 may be configured for placement over the first (e.g., male/lower) molding surface 74, and the moveable gage pins 90 may be configured for connection with the respective tethers 50 of the composite preform 20. Note that used here, "over" may mean "on", "on top of", "above", "over the surface of" and the like, and may include the preform 20 making contact with at least some portion of the mold surface 74 or simply hovering some distance over/above the mold surface 74.

The mold 70 may further include a controller 85 operatively connected to the moving members 89 for causing the moveable gage pins 90 to move from their respective first positions 94 to their respective second positions 96, thereby causing or facilitating a shrinkage of the planar-projected area 40 of the composite preform 20 from an initial planar-projected area 41 to a final planar-projected area 42.

Figure 15:
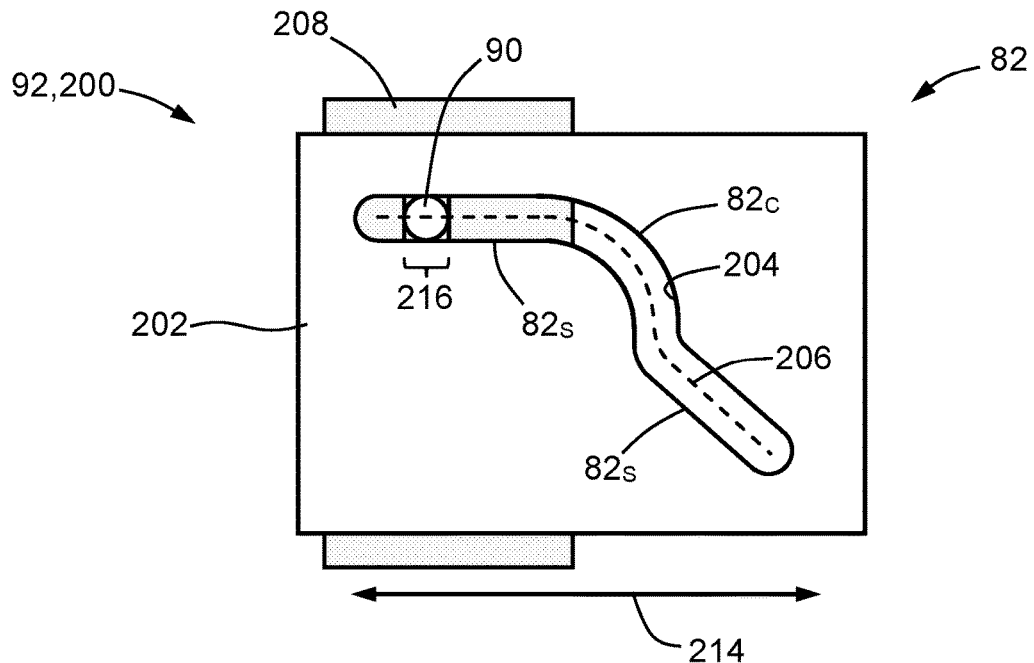
FIGS. 15-16 are schematic top views of an actuator in a second arrangement, at first and second instances, respectively.
Figure 16:
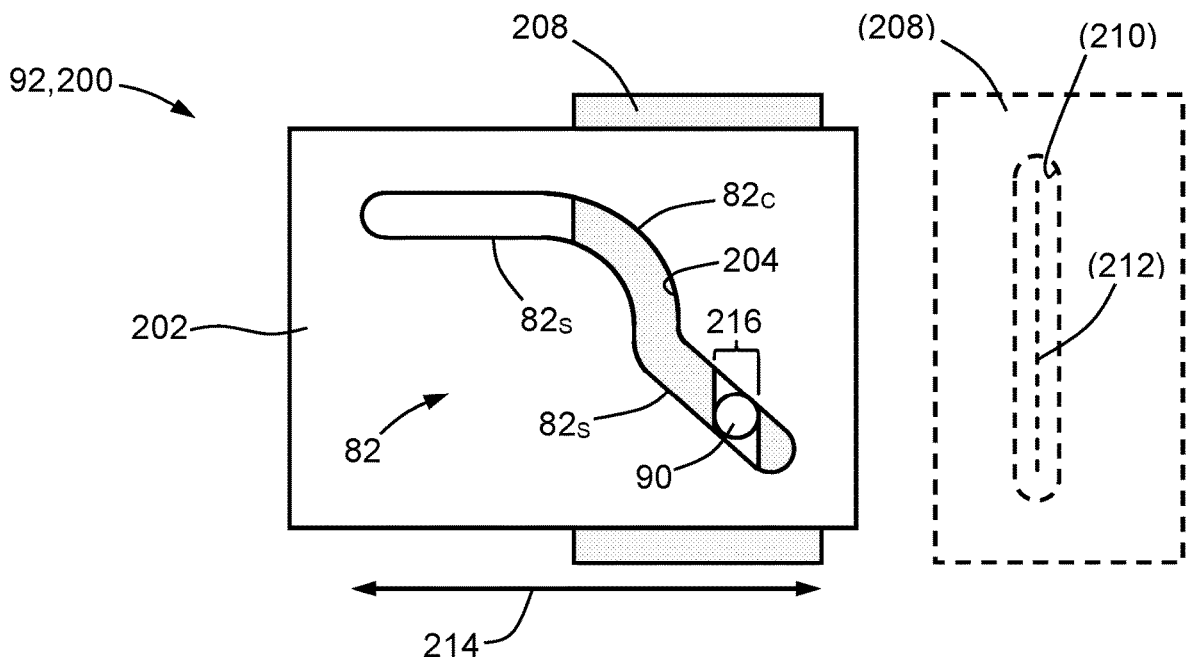
Figure 19:
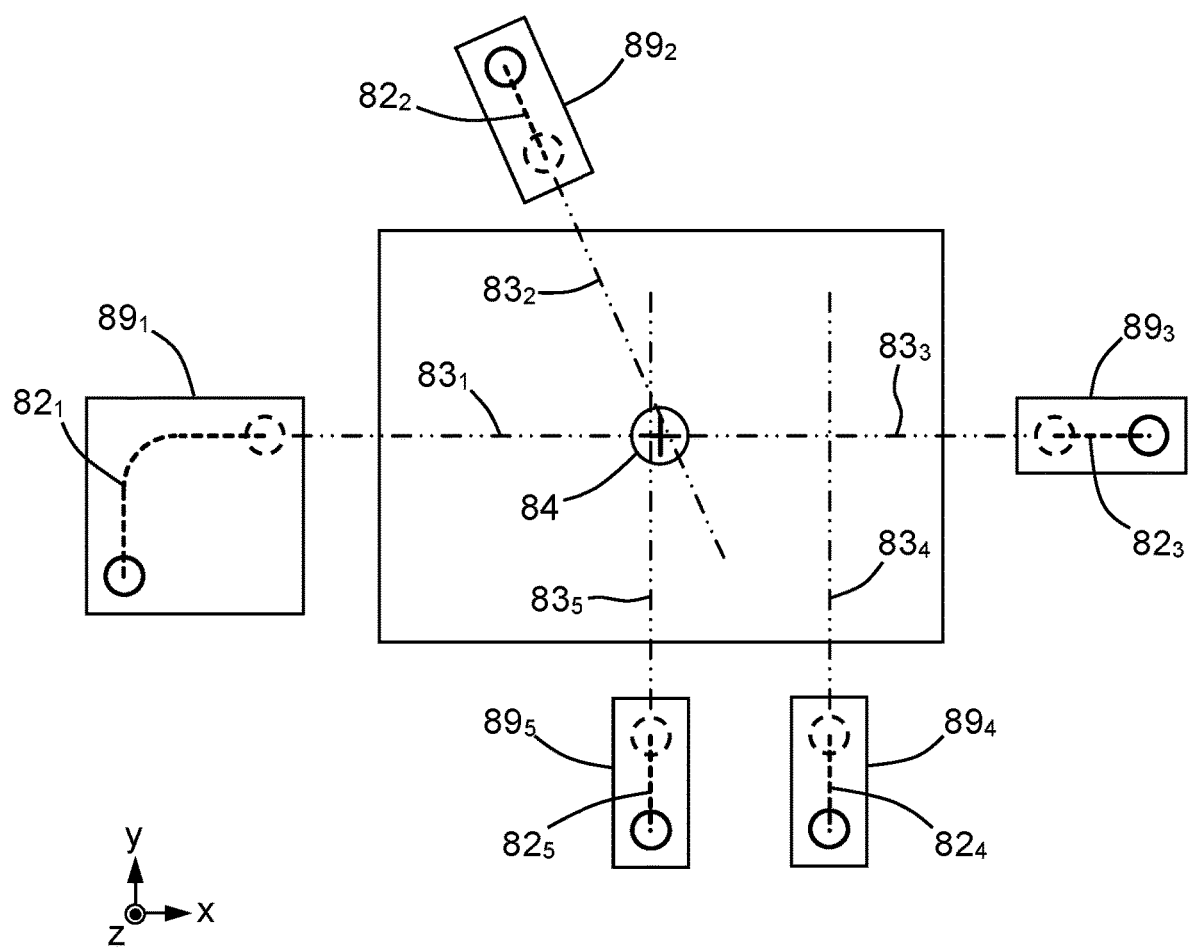
FIG. 19 is a schematic top view of a mold with moveable members and moveable gage pins showing extensions of the linear paths of the moveable gage pins.

Each moveable gage pin 90 may be configured to follow a respective linear path 82 between its respective first and second positions 94, 96. As shown in FIGS. 15-16, each linear path 82 may include one or more straight linear paths or segments $82_S$, one or more curved linear paths or segments $82_C$, or a combination of one or more straight linear paths $82_S$ and one or more curved linear paths $82_C$, and each linear path 82 may be disposed in two dimensions (e.g., between two points in an x-y plane) or in three dimensions (e.g., between in two points in x-y-z space). As illustrated in FIG. 19, in which five moveable members $89_1$, $89_2$, $89_3$, $89_4$, $89_5$ are shown, two or more of the linear paths $82_1$, $82_2$, $82_3$, $82_5$ may have respective extensions $83_1$, $83_2$, $83_3$, $83_5$ which intersect to define a central point or area 84, and at least one other of the linear paths $82_3$ of one or more moveable members $89_3$ may have a respective extension $83_3$ which does not point toward the central point or area 84, such that not all of the linear paths point in the direction of the central point or area 84.

Figure 13:
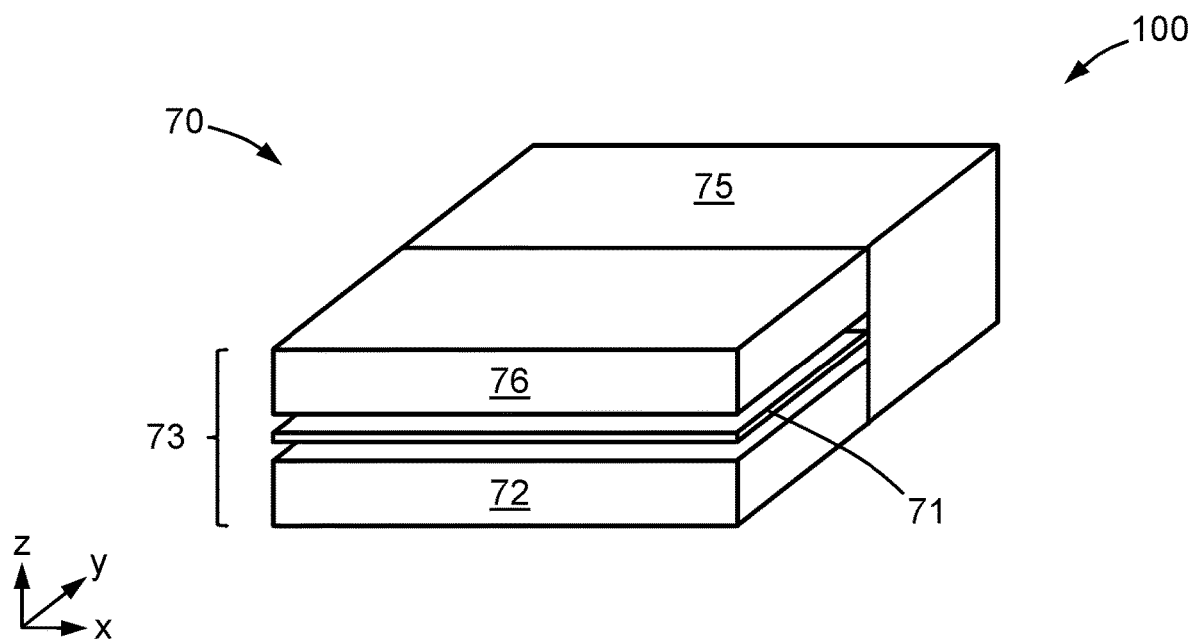
FIG. 13 is a schematic perspective view of a mold having an actuator in a first arrangement.
Figure 14:
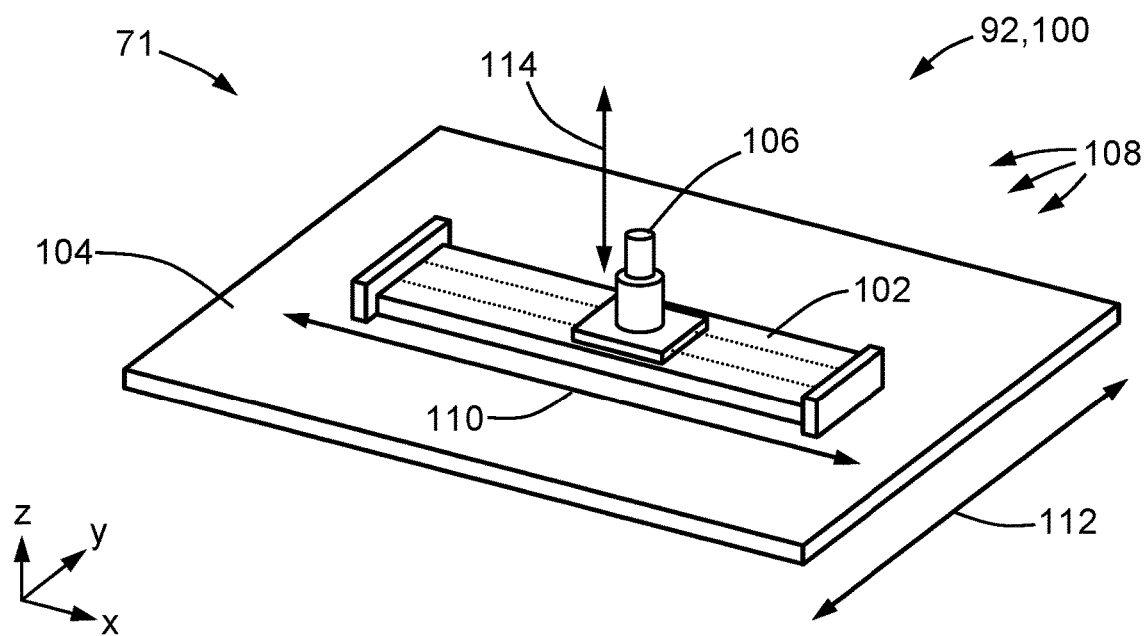
FIG. 14 is a schematic perspective close-up view of the actuator in the first arrangement.

The actuators 92 may take the form of various arrangements and configurations. For example, as illustrated in FIGS. 13-14, one or more of the actuators 92 may be deployed in a first arrangement 100. As shown in FIG. 13, a mold 70 configured in the first arrangement 100 may include an extension plate assembly 71 sandwiched between two mold halves 72, 76, thus defining a moveable tooling area 73, which is operatively associated with a main tooling area 75. FIG. 14 shows the extension plate assembly 71 in further detail. This first arrangement 100 may include one or more of: (i) a linear actuator 102 for directly or indirectly moving the moveable gage pin 90 along a first direction 110 (e.g., an x-direction); (ii) an extension plate 104 for directly or indirectly moving the moveable gage pin 90 along a second direction 112 (e.g., a y-direction); (iii) an extendable member 106 for directly or indirectly moving the moveable gage pin 90 along a third direction 114 (e.g., a z-direction); and (iv) one or more mechanical interconnections 108 between or among two or more of the linear actuator 102, the extension plate 104 and the extendable member 106. The extension plate 104 may include pneumatic or electromechanical elements which drive and control the movement of the plate 104, and the extendable member 106 may include a pneumatically or electromechanically driven telescoping tube which raises and lowers the moveable gage pin 90.

Alternatively, one or more of the actuators 92 may include a second arrangement 200, as illustrated in FIGS. 15-16. This second arrangement 200 may include a fixed plate 202 having a first aperture 204 formed therein along a first path 206, and a moveable plate 208 having a second aperture 210 formed therein along a second path 212. In this arrangement 200, the moveable plate 208 may be configured for movement along a primary direction 214 during which the first and second apertures 204, 210 overlap each other to form a pocket 216 for receiving a respective one of the moveable gage pins 90 therein, such that during the movement of the moveable plate 208, the respective moveable gage pin 90 is urged along its respective linear path 82.

Figure 17:
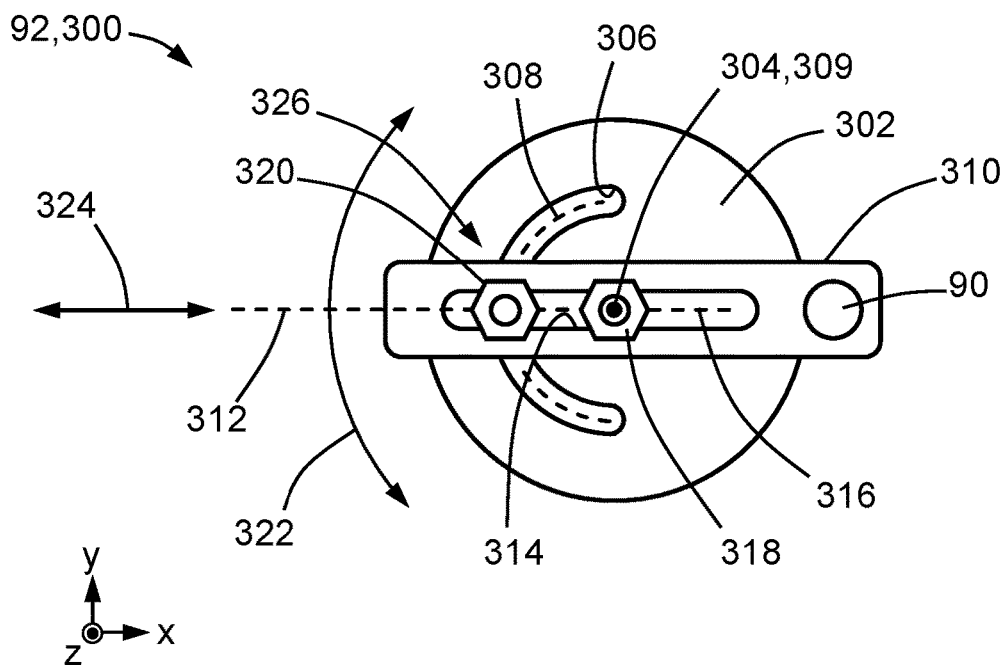
FIGS. 17-18 are schematic top views of an actuator in a third arrangement, at first and second orientations, respectively.
Figure 18:
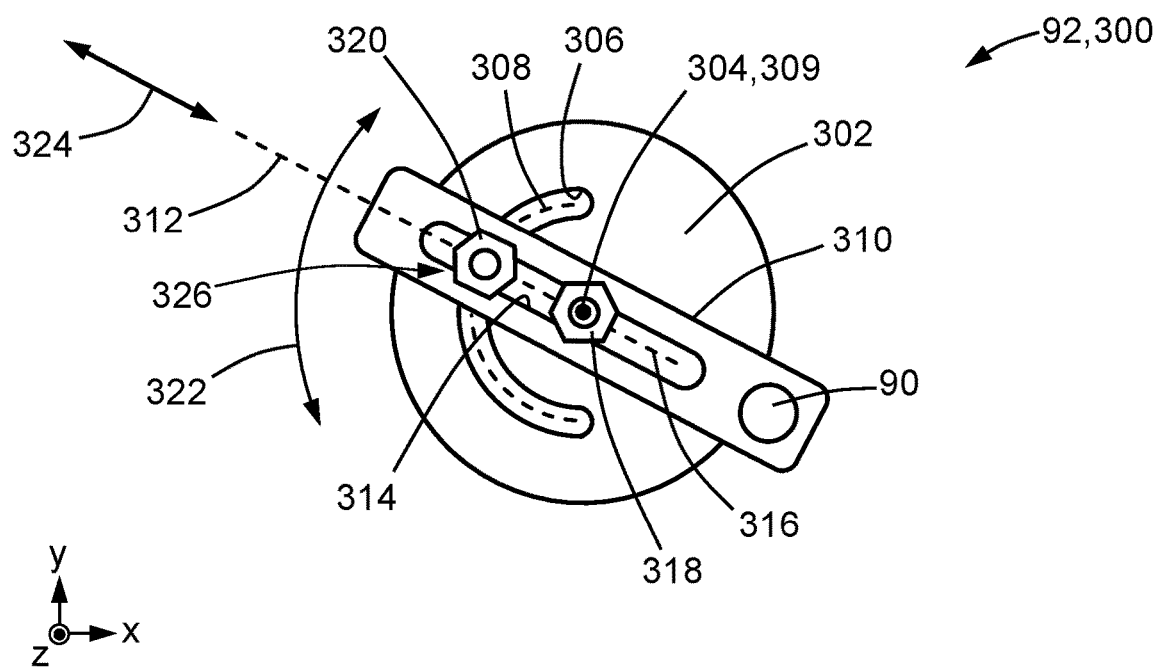

As a further alternative, one or more of the actuators may include a third arrangement 300, as illustrated in FIGS. 17-18. This third arrangement 300 may include a rotatable plate 302 configured for rotation about a rotational axis 304 (and optionally configured for sliding along a plane, such as along the x- and y-directions shown.) The rotatable plate 302 has an arcuate aperture 306 formed therein along a circumferential path 308 and a through-hole 309 formed therein. The circumferential path 308 is disposed in a circumferential direction 322 about the rotational axis 304. The third arrangement 300 also includes a translatable plate 310 having a respective one of the moveable gage pins 90 attached thereto. The translatable plate 310 is configured for translation along a longitudinal axis 312 of the translatable plate 310 and has a straight aperture 314 formed therein along a longitudinal path 316 which is parallel to (and may be colinear with) the longitudinal axis 312. In this third arrangement 300, the arcuate and straight apertures 306, 314 overlap each other to form a pocket 326 for receiving a first fastener 318 therein, and a second fastener 320 is disposed through the straight aperture 314 and the through-hole 309, such that during the rotation of the rotatable plate 302 and/or the translation of the translatable plate 310, the respective moveable gage pin 90 is urged along its respective linear path 82. Although not shown in the drawings, the third arrangement 300 may also include motors or other actuators for rotating the rotatable plate 302, translating the translatable plate 310, and optionally sliding the rotatable plate 302 (e.g., in the x-y plane).

According to a second embodiment, a mold 70 for molding a composite preform 20 is presented, wherein the preform 20 includes a sheet 22 of composite material having an outer edge 23 thereabout and a plurality of tethers 50 each attached at respective opposed ends 52, 54 thereof to two respective connection points 32, 35 along the outer edge 23. In this embodiment, the mold 70 includes: (i) a first mold half 72 having a first molding surface 74; (ii) a second mold half 76 having a second mold surface 78; (iii) the first and second mold halves 72, 76 defining a mold body 86 and being disposed with the first and second molding surfaces 74, 78 facing each other, the mold halves 72, 76 being configured to transition between an open position 79 in which the mold halves 72, 76 are spaced apart from each other and a generally closed position 80 in which the mold halves 72, 76 are proximate each other; and (iv) a plurality of moveable members 89 each having a respective moveable gage pin 90 configured for being wrapped thereabout by a respective one of the plurality of tethers 50 when the composite preform 20 is disposed between the first and second mold halves 72, 76 and a respective actuator 92 configured for moving the respective moveable gage pin 90 between a respective first position 94 in which the respective moveable gage pin 90 is disposed at a respective first distance 95 from a center $86_C$ of the mold body 86 and a respective second position 96 in which the respective moveable gage pin 90 is disposed at a respective second distance 97 from the center $86_C$ of the mold body 86 that is less than the first distance 95. In this second embodiment, the moveable members 89 are configured such that when the composite preform 20 is placed between the first and second mold halves 72, 76 in the open position 79 and each moveable gage pin 90 is wrapped thereabout by a respective tether 50, and the actuators 92 move their respective moveable gage pins 90 from their respective first positions 94 to their respective second positions 96 as the mold halves 72, 76 are moved into the generally closed position 80, the moveable members 89 are effective to cause or facilitate a shrinkage of a planar-projected area 40 of the composite preform 20. Further, in this embodiment, each of the plurality of moveable members 89 is configured, sized and disposed such that a respective tether 50 may be wrapped about the respective moveable gage pin 90 in either a hanger configuration 61 in which the respective tether 50 does not cross itself or a loop configuration 55 in which the respective tether 50 does cross itself.

The mold 70 may further include one or more stationary gage pins 99, where each is configured for being wrapped thereabout by a respective one of the plurality of tethers 50 and for remaining in a fixed position $99_F$ when the plurality of moveable members 89 are moved from their respective first positions 94 to their respective second positions 96. The mold 70 may further be configured such that one of the first and second molding surfaces 74, 78 protrudes generally outward from its respective mold half 72, 76, while the other of the first and second molding surfaces 74, 78 recedes generally into its respective mold half 72, 76.

In this embodiment, each moveable gage pin 90 may be configured to follow a respective linear path 82 between its respective first and second positions 94, 96, and each linear path 82 may include one or more straight linear paths $82_S$, one or more curved linear paths $82_C$, or a combination of one or more straight linear paths $82_S$ and one or more curved linear paths $82_C$. In this configuration, two or more of the linear paths 82 may have respective extensions 83 which intersect to define a central point or area 84, and at least one other of the linear paths 82 may have a respective extension 83 which does not point toward the central point or area 84.

In this second embodiment, at least one of the actuators 92 may include a first arrangement 100 which includes one or more of: a linear actuator 102 for directly or indirectly moving the moveable gage pin 90 along a first direction 110; an extension plate 104 for directly or indirectly moving the moveable gage pin 90 along a second direction 112 different from the first direction 110; an extendable member 106 for directly or indirectly moving the moveable gage pin 90 along a third direction 114 different from each of the first and second directions 110, 112; and one or more mechanical interconnections 108 between or among two or more of the linear actuator 102, the extension plate 104 and the extendable member 106.

As an additional or alternative aspect, at least one of the actuators 92 may include a second arrangement 200 which includes: a fixed plate 202 having a first aperture 204 formed therein along a first path 206; and a moveable plate 208 having a second aperture 210 formed therein along a second path 212, the moveable plate 208 being configured for movement along a primary direction 214 during which the first and second apertures 204, 210 overlap each other to form a pocket 216 for receiving a respective one of the moveable gage pins 90 therein, such that during the movement the respective moveable gage pin 90 is urged along the respective linear path 82 of the moveable gage pin 90.

And as a further additional or alternative aspect, at least one of the actuators 92 may include a third arrangement 300 which includes: a rotatable plate 302 configured for rotation about a rotational axis 304 and having an arcuate aperture 306 formed therein along a circumferential path 308 and a through-hole 309 formed therein; and a translatable plate 310 having a respective one of the moveable gage pins 90 attached thereto and being configured for translation along a longitudinal axis 312 thereof and having a straight aperture 314 formed therein along a longitudinal path 316, wherein the arcuate and straight apertures 306, 314 overlap each other to form a pocket 326 for receiving a first fastener 318 therein and wherein a second fastener 320 is disposed through the straight aperture 314 and the through-hole 309, such that during the rotation and/or translation the respective moveable gage pin 90 is urged along the respective linear path 82 of the moveable gage pin 90.

According to a third embodiment, a mold 70 is presented for molding a composite preform 20, in which the preform 20 includes a sheet 22 of composite material having an outer edge 23 thereabout and a plurality of tethers 50 each attached at respective opposed ends 52, 54 thereof to two respective connection points 32, 35 along the outer edge 23. In this embodiment, the mold 70 includes: first and second mold halves 72, 76 having respective first and second molding surfaces 74, 78 and defining a mold body 86, the mold halves 72, 76 being configured for disposition with the first and second molding surfaces 74, 78 facing each other, the mold halves 72, 76 being configured to transition between an open position 79 in which the mold halves 72, 76 are spaced apart from each other and a generally closed position 80 in which the mold halves 72,76 are proximate each other; and a plurality of moveable members 89 each having a respective moveable gage pin 90 configured for being wrapped thereabout by a respective one of the plurality of tethers 50 when the composite preform 20 is disposed between the first and second mold halves 72, 76 and a respective actuator 92 configured for moving the respective moveable gage pin 90 between a respective first position 94 in which the respective moveable gage pin 90 is disposed at a respective first distance 95 from a center $86_C$ of the mold body 86 and a respective second position 96 in which the respective moveable gage pin 90 is disposed at a respective second distance 97 from the center $86_C$ of the mold body 86 that is less than the first distance 95.

In this third embodiment, at least one of the actuators 92 includes: (i) a first arrangement 100 comprising one or more of a linear actuator 102 for directly or indirectly moving the moveable gage pin 90 along a first direction 110, an extension plate 104 for directly or indirectly moving the moveable gage pin 90 along a second direction 112, an extendable member 106 for directly or indirectly moving the moveable gage pin 90 along a third direction 114; and one or more mechanical interconnections 108 between or among two or more of the linear actuator 102, the extension plate 104 and the extendable member 106; or (ii) a second arrangement 200 comprising a fixed plate 202 having a first aperture 204 formed therein along a first path 206, and a moveable plate 208 having a second aperture 210 formed therein along a second path 212, the moveable plate 208 being configured for movement along a primary direction 214 during which the first and second apertures 204, 210 overlap each other to form a pocket 216 for receiving a respective one of the moveable gage pins 90 therein, such that during the movement the respective moveable gage pin 90 is urged along the respective linear path 82 of the moveable gage pin 90; or (iii) a third arrangement 300 comprising a rotatable plate 302 configured for rotation about a rotational axis 304 and having an arcuate aperture 306 formed therein along a circumferential path 308 and a through-hole 309 formed therein, and a translatable plate 310 having a respective one of the moveable gage pins 90 attached thereto and being configured for translation along a longitudinal axis 312 thereof and having a straight aperture 314 formed therein along a longitudinal path 316, wherein the arcuate and straight apertures 306, 314 overlap each other to form a pocket 326 for receiving a first fastener 318 therein and wherein a second fastener 320 is disposed through the straight aperture 314 and the through-hole 309, such that during the rotation and/or translation the respective moveable gage pin 90 is urged along the respective linear path 82 of the moveable gage pin 90.

In this third embodiment, the moveable members 89 may be configured such that when the composite preform 20 is placed between the first and second mold halves 72, 76 in the open position 79 and each moveable gage pin 90 is wrapped thereabout by a respective tether 50, and the actuators 92 move their respective moveable gage pins 90 from their respective first positions 94 to their respective second positions 96 as the mold halves 72, 76 are moved into the generally closed position 80, the moveable members 89 are effective to cause or facilitate a shrinkage of a planar-projected area 40 of the composite preform 20. Further, each of the plurality of moveable members 89 may be configured such that a respective tether 50 may be wrapped about the respective moveable gage pin 90 in either a hanger configuration 61 in which the respective tether 50 does not cross itself or a loop configuration 55 in which the respective tether 50 does cross itself.

It may be noted that FIGS. 5-19 may be variously referenced to illustrate each of the abovementioned first, second and third embodiments.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A mold for molding a composite preform, wherein the preform includes a sheet of composite material having an outer edge thereabout and a plurality of tethers each attached at respective opposed ends thereof to the outer edge, the mold comprising:
    a first mold half having a first molding surface;
    a second mold half having a second mold surface;
    the first and second mold halves defining a mold body and being disposed with the first and second molding surfaces facing each other, the mold halves being configured to transition between an open position in which the mold halves are spaced apart from each other and a generally closed position in which the mold halves are proximate each other; and
    a plurality of moveable members each having a respective moveable gage pin configured for being wrapped thereabout by a respective one of the plurality of tethers and a respective actuator configured for moving the respective moveable gage pin along a respective linear path between a respective first position in which the respective moveable gage pin is disposed at a respective first distance from a center of the mold body and a respective second position in which the respective moveable gage pin is disposed at a respective second distance from the center of the mold body that is less than the first distance;
    wherein at least one of the actuators includes an arrangement comprising;
    a rotatable plate configured for rotation about a rotational axis and having an arcuate aperture formed therein along a circumferential path and a through-hole formed therein; and
    a translatable plate having a respective one of the moveable gage pins attached thereto and being configured for translation along a longitudinal axis thereof and having a straight aperture formed therein along a longitudinal path, wherein the accurate and straight apetures overlap each other to form a pocket for receiving a first fastener therein and wherein a second fastener is disposed through the straight aperture and the through-hole, such that during the rotation and/or translation the respective moveable gage pin is urged along the respective linear path of the respective moveable gage pin.

2. The mold of claim 1, wherein the moveable members are configured such that when the composite preform is placed between the first and second mold halves in the open position and each moveable gage pin is wrapped thereabout by a respective tether and the actuators move their respective moveable gage pins from their respective first positions to their respective second positions as the mold halves are moved into the generally closed position, the moveable members are effective to cause or facilitate a shrinkage of a planar-projected area of the composite preform.

3. The mold of claim 2, wherein each of the plurality of moveable members is configured such that a respective tether may be wrapped about the respective moveable gage pin in either a hanger configuration in which the respective tether does not cross itself or a loop configuration in which the respective tether does cross itself.

4. The mold of claim 1, further comprising:
    one or more stationary gage pins each configured for being wrapped thereabout by a respective one of the plurality of tethers and for remaining in a fixed position when the plurality of moveable members are moved from their respective first positions to their respective second positions.

5. The mold of claim 1, wherein one of the first and second molding surfaces protrudes generally outward from its respective mold half, and the other of the first and second molding surfaces recedes generally into its respective mold half.

6. The mold of claim 1, wherein each moveable gage pin is configured to follow a respective linear path between its respective first and second positions, and wherein each linear path comprises one or more straight linear paths, one or more curved linear paths, or a combination of one or more straight linear paths and one or more curved linear paths.

7. The mold of claim 6, wherein two or more of the linear paths have respective extensions which intersect to define a central point or area, and wherein at least one other of the linear paths has a respective extension which does not point toward the central point or area.

8. The mold of claim 1, wherein at least one of the actuators includes a first arrangement comprising one or more of:
    a linear actuator for directly or indirectly moving the moveable gage pin along a first direction;
    an extension plate for directly or indirectly moving the moveable gage pin along a second direction;
    an extendable member for directly or indirectly moving the moveable gage pin along a third direction; and
    one or more mechanical interconnections between or among two or more of the linear actuators, the extension plate and the extendable member.

9. The mold of claim 1, wherein at least one of the actuators includes a second arrangement comprising:
    a fixed plate having a first aperture formed therein along a first path; and
    a moveable plate having a second aperture formed therein along a second path, the moveable plate being configured for movement along a primary direction during which the first and second apertures overlap each other to form a pocket for receiving a respective one of the moveable gage pins therein, such that during the movement the respective moveable gage pin is urged along the respective linear path of the moveable gage pin.

10. A mold for molding a composite preform, wherein the preform includes a sheet of composite material having an outer edge thereabout and a plurality of tethers each attached at respective opposed ends thereof to two respective points along the outer edge, the mold comprising:
    a first mold half having a first molding surface;
    a second mold half having a second mold surface;
    the first and second mold halves defining a mold body and being disposed with the first and second molding surfaces facing each other, the mold halves being configured to transition between an open position in which the mold halves are spaced apart from each other and a generally closed position in which the mold halves are proximate each other; and
    a plurality of moveable members each having a respective moveable gage pin configured for being wrapped thereabout by a respective one of the plurality of tethers when the composite preform is disposed between the first and second mold halves and a respective actuator configured for moving the respective moveable gage pin along a respective linear path between a respective first position in which the respective moveable gage pin is disposed at a respective first distance from a center of the mold body and a respective second position in which the respective moveable gage pin is disposed at a respective second distance from the center of the mold body that is less than the first distance;

wherein the moveable members are configured such that when the composite preform is placed between the first and second mold halves in the open position and each moveable gage pin is wrapped thereabout by a respective tether and the actuators move their respective moveable gage pins from their respective first positions to their respective second positions as the mold halves are moved into the generally closed position, the moveable members are effective to cause or facilitate a shrinkage of a planar-projected area of the composite preform, and wherein each of the plurality of moveable members is configured such that a respective tether may be wrapped about the respective moveable gage pin in either a hanger configuration in which the respective tether does not cross itself or a loop configuration in which the respective tether does cross itself;

wherein at least one of the actuators Includes an arrangement comprising, a rotatable plate configured for rotation about a rotational axis and having an arcuate aperture formed therein along a circumferential path and a through-hole formed therein; and a translatable plate having a respective one of the moveable gage pins attached thereto and being configured for translation along a longitudinal axis thereof and having a straight aperture formed therein along a longitudinal path, wherein the arcuate and straight apertures overlap each other to form a pocket for receiving a first fastener therein and wherein a second fastener is disposed through the straight aperture and the through-hole, such that during the rotation and/or translation the respective moveable gage pin is urged along the respective linear path of the respective moveable gage pin.

11. The mold of claim 10, further comprising:
one or more stationary gage pins each configured for being wrapped thereabout by a respective one of the plurality of tethers and for remaining in a fixed position when the plurality of moveable members are moved from their respective first positions to their respective second positions.

12. The mold of claim 10, wherein one of the first and second molding surfaces protrudes generally outward from its respective mold half, and the other of the first and second molding surfaces recedes generally into its respective mold half.

13. The mold of claim 10, wherein each gage pin is configured to follow a respective linear path between its respective first and second positions, and wherein each linear path comprises one or more straight linear paths, one or more curved linear paths, or a combination of one or more straight linear paths and one or more curved linear paths.

14. The mold of claim 13, wherein two or more of the linear paths have respective extensions which intersect to define a central point or area, and wherein at least one other of the linear paths has a respective extension which does not point toward the central point or area.

15. The mold of claim 10, wherein at least one of the actuators includes a first arrangement comprising one or more of:
a linear actuator for directly or indirectly moving the moveable gage pin along a first direction;
an extension plate for directly or indirectly moving the moveable gage pin along a second direction different from the first direction;
an extendable member for directly or indirectly moving the moveable gage pin along a third direction different from each of the first and second directions; and
one or more mechanical interconnections between or among two or more of the linear actuators, the extension plate and the extendable member.

16. The mold of claim 10, wherein at least one of the actuators includes a second arrangement comprising:
a fixed plate having a first aperture formed therein along a first path; and
a moveable plate having a second aperture formed therein along a second path, the moveable plate being configured for movement along a primary direction during which the first and second apertures overlap each other to form a pocket for receiving a respective one of the moveable gage pins therein, such that during the movement the respective moveable gage pin is urged along the respective linear path of the moveable gage pin.

17. A mold for molding a composite preform, wherein the preform includes a sheet of composite material having an outer edge thereabout and a plurality of tethers each attached at respective opposed ends thereof to two respective points along the outer edge, the mold comprising:
first and second mold halves having respective first and second molding surfaces and defining a mold body, the mold halves being configured for disposition with the first and second molding surfaces facing each other, the mold halves being configured to transition between an open position in which the mold halves are spaced apart from each other and a generally closed position in which the mold halves are proximate each other; and
a plurality of moveable members each having a respective moveable gage pin configured for being wrapped thereabout by a respective one of the plurality of tethers when the composite preform is disposed between the first and second mold halves and a respective actuator configured for moving the respective moveable gage pin along a respective linear path between a respective first position in which the respective moveable gage pin is disposed at a respective first distance from a center of the mold body and a respective second position in which the respective moveable gage pin is disposed at a respective second distance from the center of the mold body that is less than the first distance;
wherein at least one of the actuators includes
an arrangement comprising a rotatable plate configured for rotation about a rotational axis and having an arcuate aperture formed therein along a circumferential path and a through-hole formed therein, and a translatable plate having a respective one of the moveable gage pins attached thereto and being configured for translation along a longitudinal axis thereof and having a straight aperture formed therein along a longitudinal path, wherein the arcuate and straight apertures overlap each other to form a pocket for receiving a first fastener therein and wherein a second fastener is disposed through the straight aperture and the through-hole, such that during the rotation and/or translation the respective moveable gage pin is urged along the respective linear path of the respective moveable gage pin.

18. The mold of claim 17, wherein the moveable members are configured such that when the composite preform is placed between the first and second mold halves in the open position and each moveable gage pin is wrapped thereabout by a respective tether and the actuators move their respective moveable gage pins from their respective first positions to their respective second positions as the mold halves are moved into the generally closed position, the moveable members are effective to cause or facilitate a shrinkage of a planar-projected area of the composite preform, and wherein each of the plurality of moveable members is configured such that a respective tether may be wrapped about the respective moveable gage pin in either a hanger configuration in which the respective tether does not cross itself or a loop configuration in which the respective tether does cross itself.

19. The mold of claim 17, further comprising:

one or more stationary gage pins each configured for being wrapped thereabout by a respective one of the plurality of tethers and for remaining in a fixed position when the plurality of moveable members are moved from their respective first positions to their respective second positions.

20. The mold of claim 17, wherein each moveable gage pin is configured to follow a respective linear path between its respective first and second positions, wherein each linear path comprises one or more straight linear paths, one or more curved linear paths, or a combination of one or more straight linear paths and one or more curved linear paths, wherein two or more of the linear paths have respective extensions which intersect to define a central point or area, and wherein at least one other of the linear paths has a respective extension which does not point toward the central point or area.

* * * * *